(12) United States Patent
Melnyk

(10) Patent No.: US 7,609,368 B2
(45) Date of Patent: Oct. 27, 2009

(54) OPTICAL DEVICE AND METHOD FOR SENSING MULTIPHASE FLOW

(75) Inventor: Ivan Melnyk, Coquitlam (CA)

(73) Assignee: Photon Control Inc., British Columbia (CA)

( * ) Notice: Subject to any disclaimer, the term of this patent is extended or adjusted under 35 U.S.C. 154(b) by 0 days.

(21) Appl. No.: 10/579,847

(22) PCT Filed: Nov. 16, 2004

(86) PCT No.: PCT/CA2004/001971

§ 371 (c)(1),
(2), (4) Date: Jun. 6, 2008

(87) PCT Pub. No.: WO2005/047908

PCT Pub. Date: May 26, 2005

(65) Prior Publication Data

US 2008/0231860 A1    Sep. 25, 2008

(30) Foreign Application Priority Data

Nov. 17, 2003    (CA) .................................... 2449551

(51) Int. Cl.
*G01P 3/36* (2006.01)
*G01F 1/704* (2006.01)
(52) U.S. Cl. ..................................... 356/28; 73/861.06
(58) Field of Classification Search .................. 356/28, 356/28.5; 73/861, 861.05, 861.06
See application file for complete search history.

(56) References Cited

U.S. PATENT DOCUMENTS

| 4,201,467 | A | | 5/1980 | Hartmann et al. |
| 4,251,733 | A | | 2/1981 | Hirleman, Jr. |
| 4,402,230 | A | | 9/1983 | Raptis |
| 5,005,144 | A | * | 4/1991 | Nakajima et al. ............. 702/45 |
| 6,570,647 | B1 | | 5/2003 | Meili |
| 6,611,319 | B2 | | 8/2003 | Wang |
| 7,032,432 | B2 | * | 4/2006 | Gysling et al. ............. 73/24.01 |
| 2003/0142289 | A1 | * | 7/2003 | Ortyn et al. .................... 356/28 |

FOREIGN PATENT DOCUMENTS

WO    WO02/077578    10/2002

* cited by examiner

*Primary Examiner*—Isam Alsomiri
(74) *Attorney, Agent, or Firm*—D. Peter Hochberg; Sean F. Mellino; Daniel J. Smola

(57) ABSTRACT

A method for measuring the velocity of a multiphase fluid flowing in a pipe. The method comprises directing at least two collimated beams of light from an illuminator through the multiphase fluid by transparent portions of the pipe. The at least two collimated beams are spaced apart in a direction of flow of the multiphase fluid by a predetermined distance. The method also includes detecting scattered, deflected and attenuated light with at least two photodetectors to produce at least two signals. The at least two photodetectors are associated with the at least two collimated beams. The method also includes calculating a cross-correlation function between the at least two signals to determine a time delay between the signals and calculating the average velocity of the multiphase fluid by taking the ratio of the predetermined distance to the time delay.

19 Claims, 16 Drawing Sheets

OPTICAL DEVICE AND METHOD FOR SENSING MULTIPHASE FLOW

CROSS-REFERENCE TO RELATED APPLICATIONS

This application is a National Stage application of International Application No. PCT/CA2004/001971, filed on Nov. 16, 2004, which claims priority of Canadian application number 2,449,551 filed on Nov. 17, 2003.

BACKGROUND OF THE INVENTION

1. Technical Field

The present invention relates to optical flow meters for sensing the velocity of fluids, including mixtures of gaseous and liquid fractions such as steam, moving in a pipe.

2. Background

The need for measurement of the velocity and flow rate of steam, for example, is a known problem in industrial control because steam is widely used as an energy carrier in many processes and because measurement of steam flow is a complicated task. The main reason for this complication is the presence of two fractions in the flow, a gaseous or vapour phase which is mixed with a liquid phase (water). The liquid phase moves in the pipe in the form of water droplets of various sizes, fluctuating water aggregates and water condensate which collects in the bottom of the pipe if quality of steam is low. Each of the components moves with different speed. The proportion between these components varies in time, water aggregates can combine together and water condensate can suddenly be picked up and be accelerated by the flow creating a "hummer effect." In addition, the quality of steam changes along the pipe depending on the temperature outside of the pipe, pipe insulation, pipe bending, etc. All these factors make steam flow complicated for measurement.

A number of solutions have been proposed for measuring steam flow. Some are based on tracing the electrical properties of steam and water by measuring capacitance of the fluid at several points along the pipe or by tracking the variation of fluid density with ultrasound. The main drawback of these methods is high inconsistency with operating temperature. High-power industrial boilers run at temperatures higher than 350° C. which are beyond the limit of capacitive and ultrasonic methods. Other solutions based on gamma-irradiation methods could be applicable for steam measurement; however, gamma-irradiation is expensive and it creates a risk for operating personnel.

Cross-correlation methods for non-invasive measurement of fluid flow using optical means are known in the art. Optical methods usually are not adversely affected by high temperature because light sources and photodetectors can be located remotely from the hot measuring zones. U.S. Pat. No. 6,611,319 (Wang) describes an optical flow meter which is based on registration of the light twinkled (scintillated) due to the small changes of the refractive index with changes in temperature. The moving fluid is transilluminated by a single light source and the direct light is measured by two photodetectors spaced apart along the direction of flow. A cross-correlation function between signals from those photodetectors is calculated and a position of its maximum is determined. This position provides the average time which is necessary for the flow to move from one photodetector to the other. Consequently, the ratio of the distance between the photodetectors to the time delay gives an estimate of the average velocity of the flow.

A similar correlation technique has been described in WO 02/077578A1 (Hyde) for measuring gas flow in large pipes using attenuation of the light by the gas stream. Different constituents in the moving gas may have different absorption in the infrared region, which will cause modulation of the light passing through the pipe.

However, both scintillating method of Wang and the infrared absorption method of Hyde require long optical paths in order to accumulate enough abnormalities in the flow. Such methods require minimum pipe diameter of about one meter in order to perform reliable flow measurements. Diameters such as these are too big for steam pipelines where maximum diameter is 12 inches (30 cm) and most pipe sizes are from 2 inches (5 cm) to 6 inches (15 cm). In addition, the highly divergent light beam from the single light source used in the scintillating method of Wang spreads the time delay because different portions of the fluctuated flow cross the beam at different locations. This reduces the accuracy of the measurement. Collimated beams used in the infrared absorption method of Hyde are not affected by this effect, but steam does not absorb much light. High quality steam, in particular, is highly transparent over a wide range of wavelengths. Unscattered light, therefore, has a very low modulation depth due to the high intensity of direct light from the light source. In addition, none of the optical methods described above have been applied for sensing the quality of steam, which is of the same importance as velocity and flow measurement.

Therefore, there is a need for an apparatus and method for sensing the flow velocity of mixtures of gas and liquid such as occurs, for example, for steam moving in small pipes.

SUMMARY OF INVENTION

An object of the present invention is to provide an optical device and a method for sensing steam flow in industrial pipes.

It is another object of the invention to provide such an optical device and a method that will be suitable for steam of varying quality.

It is a further object of the invention to provide such an optical device and a method that may simultaneously sense the quality of steam.

According to a preferred embodiment of the present invention, two or more narrow collimated beams of light are directed towards a fluid flowing within in a pipe through transparent windows in the walls of the pipe. The beams are spaced apart along the direction of the flow. Liquid droplets and other flow components which are moving through the pipe cross the beams and scatter and deflect the light. Scattered and deflected light passes through transparent windows in the opposite side of the pipe and is focused by a collecting optical system into photodetectors. Unscattered light may be collected by another optical system for monitoring purposes and for absorption measurement if the quality of the steam is low.

In one embodiment, signals from the photodetectors are digitized and separated into different groups by filtering them with digital band-pass filters. The groups are associated with different steam components such as, for example, miniature, medium, and large droplets, and water aggregates. The differentiation is based on frequency bandwidths; lower frequencies correspond to larger droplets and higher frequencies correspond to smaller droplets. Cross-correlation functions are calculated for each group and time delays between signals from spaced apart beams are determined. The average velocity of each steam component is calculated as a ratio of spacing distance between the beams over time delay. The local velocity of each steam component is sensed by illuminating the flow with two beams from a variety of directions and collecting the deflected and scatted light from a variety of measuring zones across the pipe. According to another embodiment of the invention, additional vertical beams are delivered through the horizontally disposed pipe, thus the level of liquid condensate is measured by sensing the light absorption. Flow intensity of each flow component is determined by calculating dispersion of filtered signals. Total flow rate is calculated as the sum of all flow components measured in all measuring zones across the pipe. Gaseous or vapour fraction is defined as the fastest flow fraction moving in the pipe.

According to another embodiment of the invention, there is provided a method for measuring the velocity of a multiphase fluid flowing in a pipe. The method comprises the steps of directing a pair of collimated beams of light from an illuminator through the multiphase fluid by transparent portions of the pipe, the pair of collimated beams spaced apart in a direction of flow of the multiphase fluid by a predetermined distance; detecting scattered, deflected and attenuated light with a pair of photodetectors to produce a pair of signals, each of the pair of photodetectors associated with one of the pair of collimated beams; calculating a cross-correlation function between the pair of signals to determine a time delay between the signals; and, calculating the average velocity of the multiphase fluid by taking the ratio of the predetermined distance to the time delay.

According to another embodiment of the invention, collimated beams are focused in one direction along the flow direction to create two light sheets which are oriented perpendicular to the flow. The light sheets may be focused by a cylindrical lens. Photodetectors are associated with light sheets and they register light, scattered by liquid droplets. The fluid velocity is determined by cross-correlation technique while the amount of liquid fraction is determined from the dispersion of the photodetector signals.

According to another embodiment of the invention, a collimated beam illuminates the fluid in addition to two light sheets which are used for measurement of the fluid velocity. The collimated beam is used for calculation of the liquid fraction of the fluid by measuring the signal dispersion from a reference photodetector associated with the collimated beam. Alternatively, the liquid fraction may be calculated based on a ratio of the signals recorded by the reference photodetector while illuminating the fluid at two different wavelengths.

The described optical device and method are suitable for measuring the multiphase flow such as steam in a small pipe and provide qualitative analysis of the moving media, such as steam quality. The method is highly sensitive because it detects microscopic water droplets in high quality steam as well as large water droplets and water aggregates in low quality steam.

In this specification, water and steam measurement are referenced, but the invention applies equally to all transparent liquids and their corresponding gases. The invention can be applied to mixtures of water and hydrocarbons such as, for example, natural gas moving in a pipe. Sensing is provided by calculation of cross-correlation between signals from a number of photodetectors disposed along the pipe, which register light scattered by the gaseous fraction and deflected and absorbed by the liquid fraction.

The present invention as well as its numerous advantages will be better understood by the following nonrestrictive description of possible embodiments made in reference to the appended drawings.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
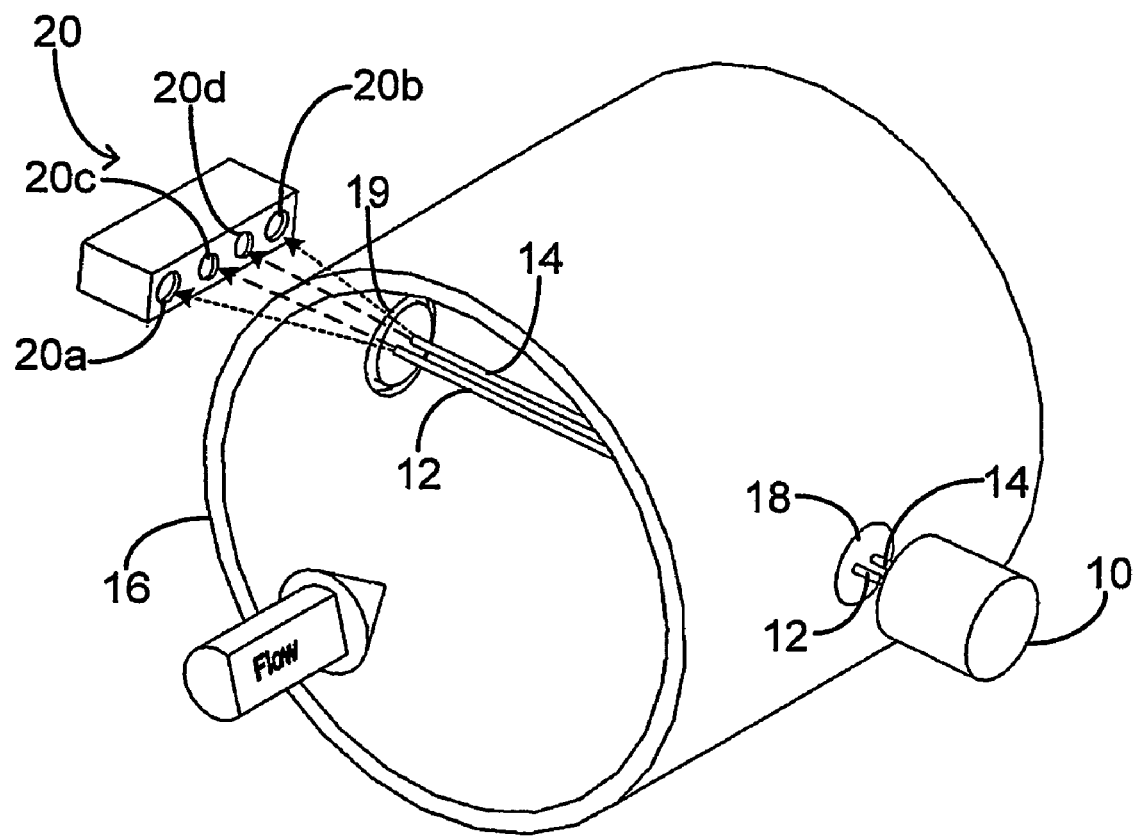
FIG. 1 is a schematic representation of an apparatus for sensing multiphase flow according to one embodiment of the invention.

FIG. 1 shows a first embodiment of an optical device for sensing multiphase flow. An illuminator 10 generates two narrow collimated beams of light 12 and 14, which enter a fluid-carrying pipe 16 through an illuminating window 18. Beams 12 and 14 may comprise infrared, ultraviolet, or visible light. Beams 12 and 14 are disposed apart at a distance d along the direction of fluid flow. Beams 12 and 14 are scattered, deflected and absorbed by the fluid moving through pipe 16. Scattered and deflected light passes through a collecting window 19 at the opposite wall of the pipe. The light passing through collecting window 19 is collected by an optical system (not shown in FIG. 1), and focused onto a photodetector array 20. Photodetector array 20 preferably comprises photodetectors 20a and 20b positioned to receive scattered and deflected light collected by the optical system under different angles, so photodetectors 20a and 20b can measure light scattered and deflected at different degrees from the optical axis of beams 12 and 14, respectively. Photodetector array 20 preferably also comprises photodetectors 20c and 20d positioned to receive direct (unscattered) light collected by the optical system, so that photodetectors 20c and 20d can measure the absorption of light from beams 12 and 14, respectively, by the flow.

Figure 2:
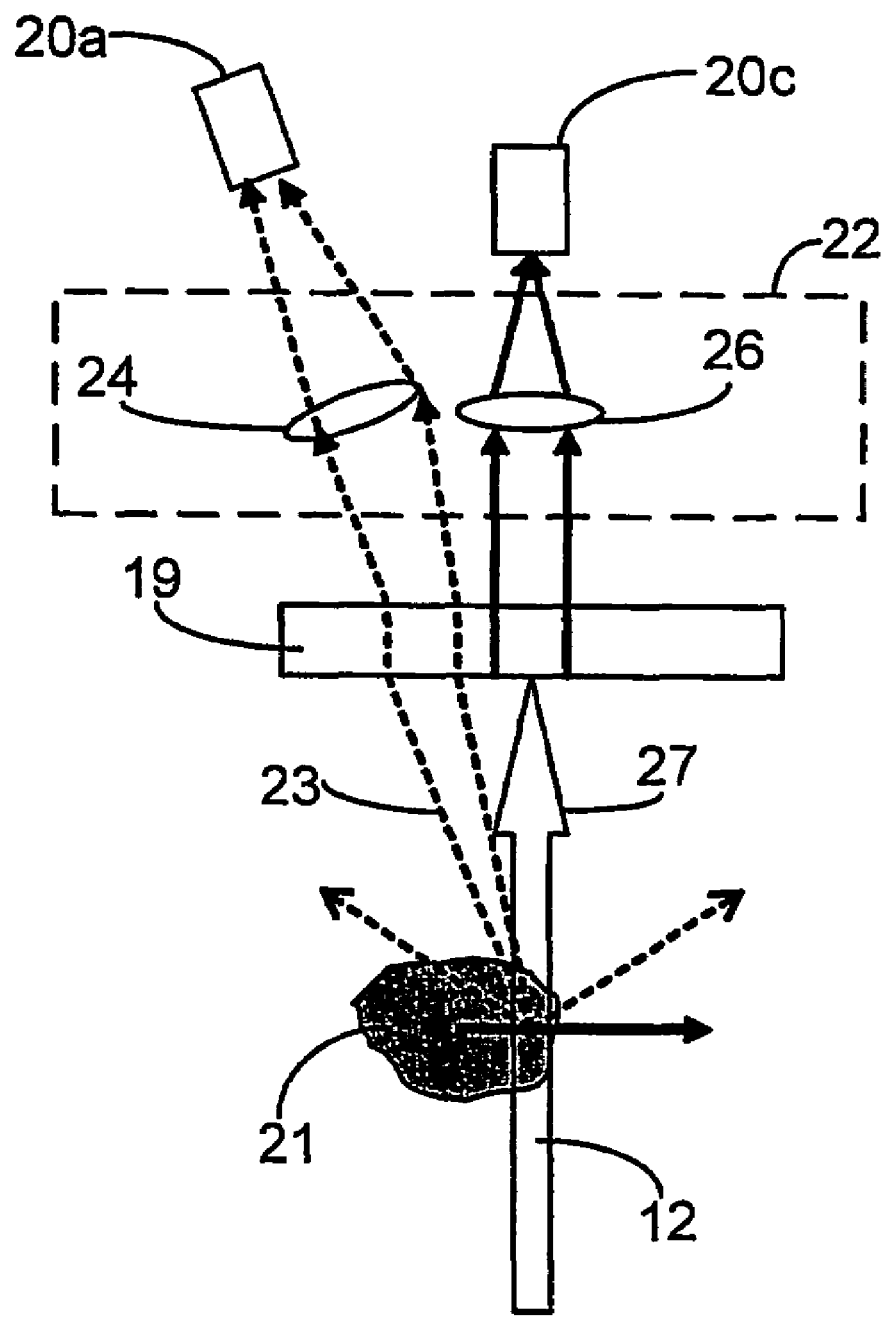
FIG. 2 is a schematic representation a portion of an optical system suitable for use with the apparatus of FIG. 1.

FIG. 2 schematically illustrates a portion of an optical system 22 suitable for use with the embodiment of FIG. 1. The illustrated portion of optical system 22 comprises optical collectors 24 and 26. A liquid droplet 21, moving in the pipe crosses beam 12. Droplet 21 scatters and deflects a portion of the light in beam 12 in a manner depending on the ratio of its size to the wavelength of the light and its refractive index. Smaller droplets with sizes comparable to the wavelength of the light predominantly scatter light in large solid angles, while larger droplets mostly deflect light in shallow angles. Scattered and deflected light 23 spreads inside the pipe and a portion of it passes through window 19 and is focused by optical collector 24 into photodetector 20a. The direct (unscattered, but attenuated) light 27 passes through window 19 and either is eliminated by absorption or is focused by optical collector 26 into photodetector 20c. Registering the direct light provides power monitoring of the illuminator 10 and indicates the light attenuation due to absorption by very large water droplets.

Figure 3A:
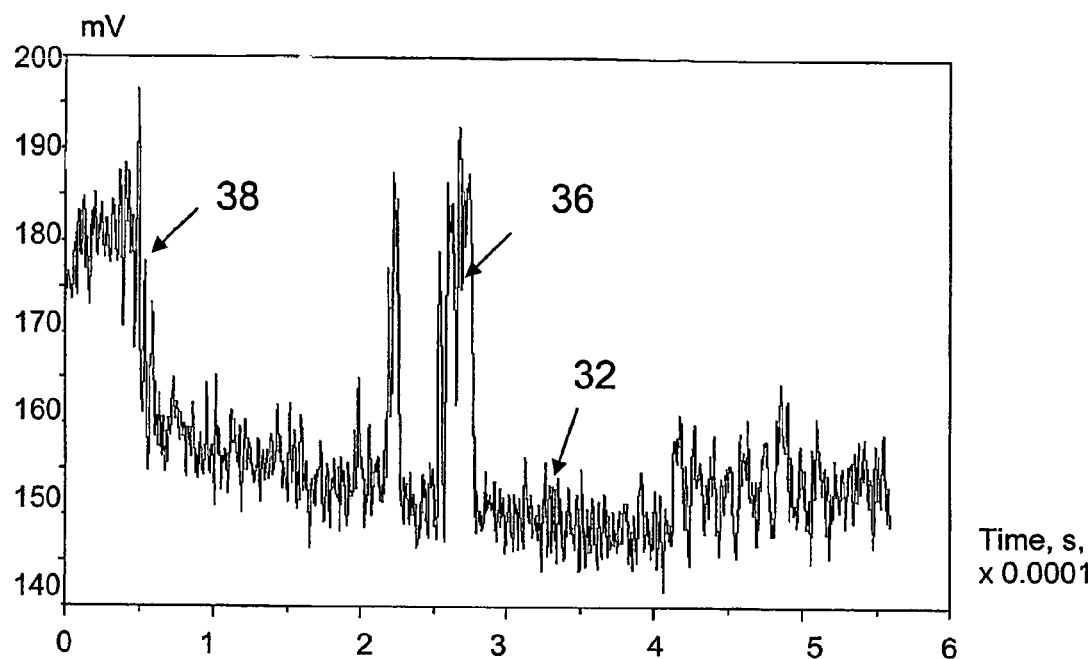
FIG. 3A is an example of signal detected by a photodetector indicating the presence of miniature and large size water droplets.
Figure 3B:
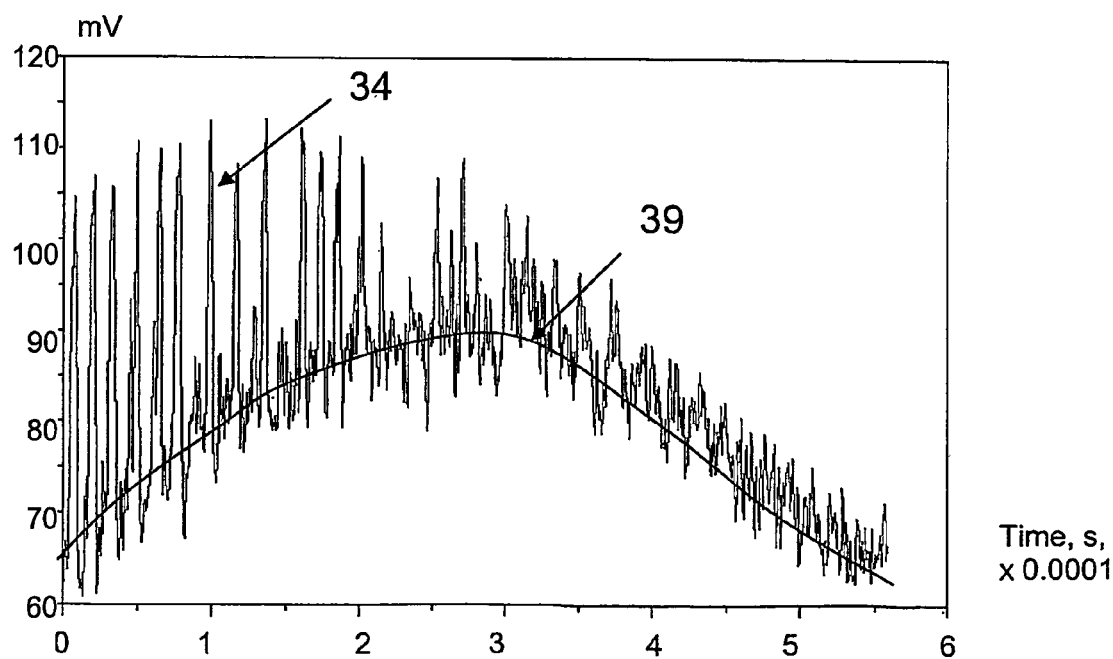
FIG. 3B is an example of signal detected by a photodetector indicating the presence of medium size water droplets and water aggregates.

The signals generated by photodetectors according to the invention are typically made up of a plurality of components of different frequencies. FIGS. 3A and 3B illustrate examples of typical signals from a photodetector, such as photodetector 20a or 20b, registering scattering light within a shallow angle to the optical axis. The graphs of FIGS. 3A and 3B plot signals from a photodetector (in millivolts) versus time (in seconds× $10^{-4}$). The example signals may be separated into a high-frequency component 32, a medium frequency component 34 and a low-frequency component 36, as well as ultra-slow components 38 and 39 (solid line), all created by different components of the fluid flow. Components 32, 34 and 36 are created respectively by miniature (size less than 1 micron), medium (size about a micron), a large (size larger than 2 microns) water droplets, and components 38 and 39 are created by water aggregates fluctuating in the pipe.

Figure 4A:
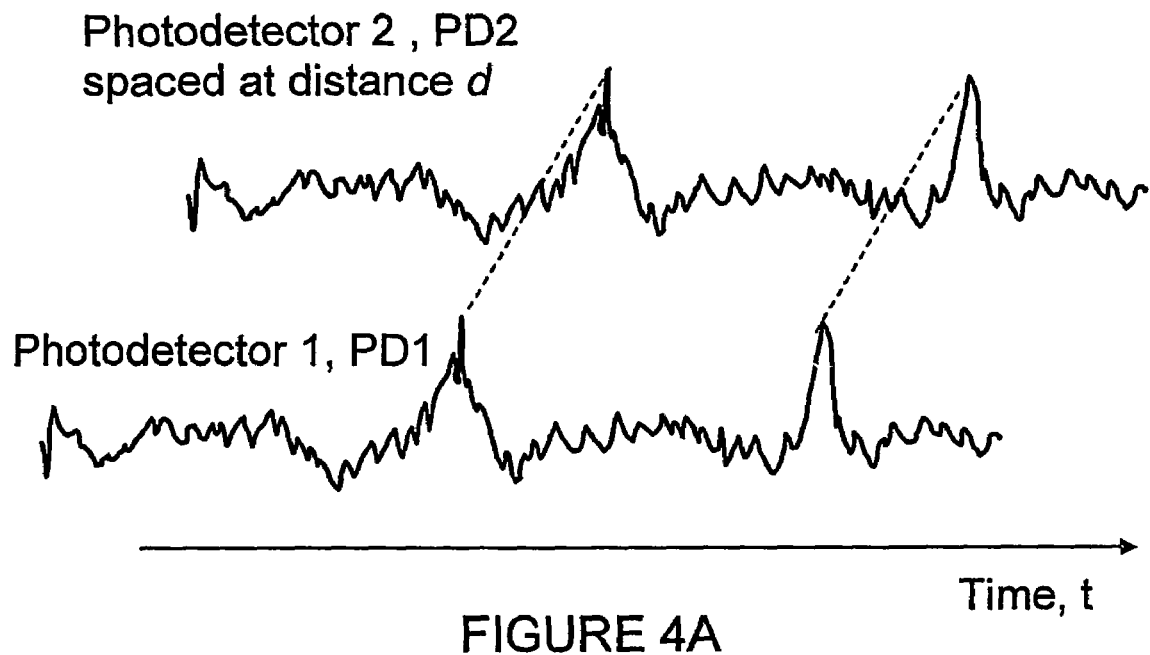
FIG. 4A is a schematic representation of signals from two photodetectors indicating a temporal shift caused by the displacement of the light beams along the flow.
Figure 4B:
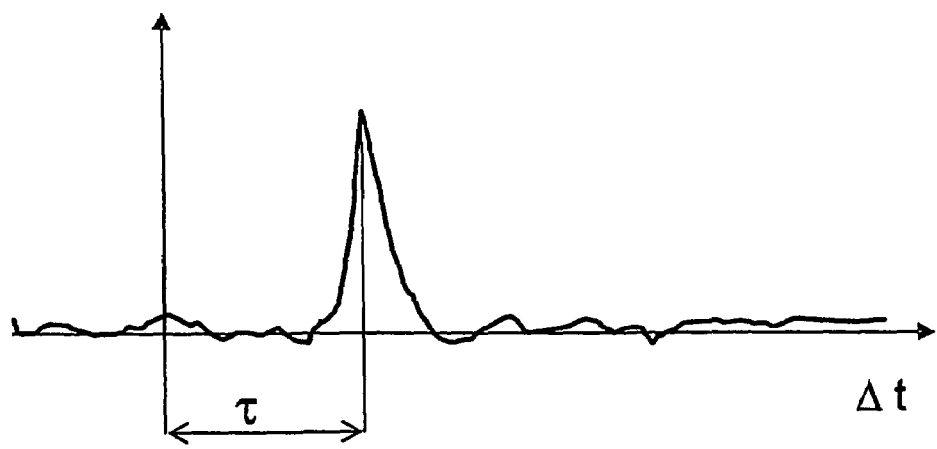
FIG. 4B is an illustration of the cross-correlation function between the two signals of FIG. 4A.

The two-beam arrangement shown in FIG. 1 leads to a temporal shift of signals. As elements of the fluid flow through pipe 16 before they pass through beam 14, and the resultant fluctuations occur in the signal from photodetector 20a before they occur in the signal from photodetector 20b. The shift is schematically shown in FIG. 4A for two photodetectors, PD1 and PD2. Photodetectors PD1 and PD2 may comprise any pair of photodetectors which register light from two beams of light separated by the distance d along the direction of the fluid flow. A cross-correlation function between the two signals from PD1 and PD2 will have a maximum at an elapsed time τ (time delay), as illustrated in FIG. 4B, defined as $$\tau = d/V$$

where d is the spacing between the beams, and V is the average velocity of the flow.

Figure 5:
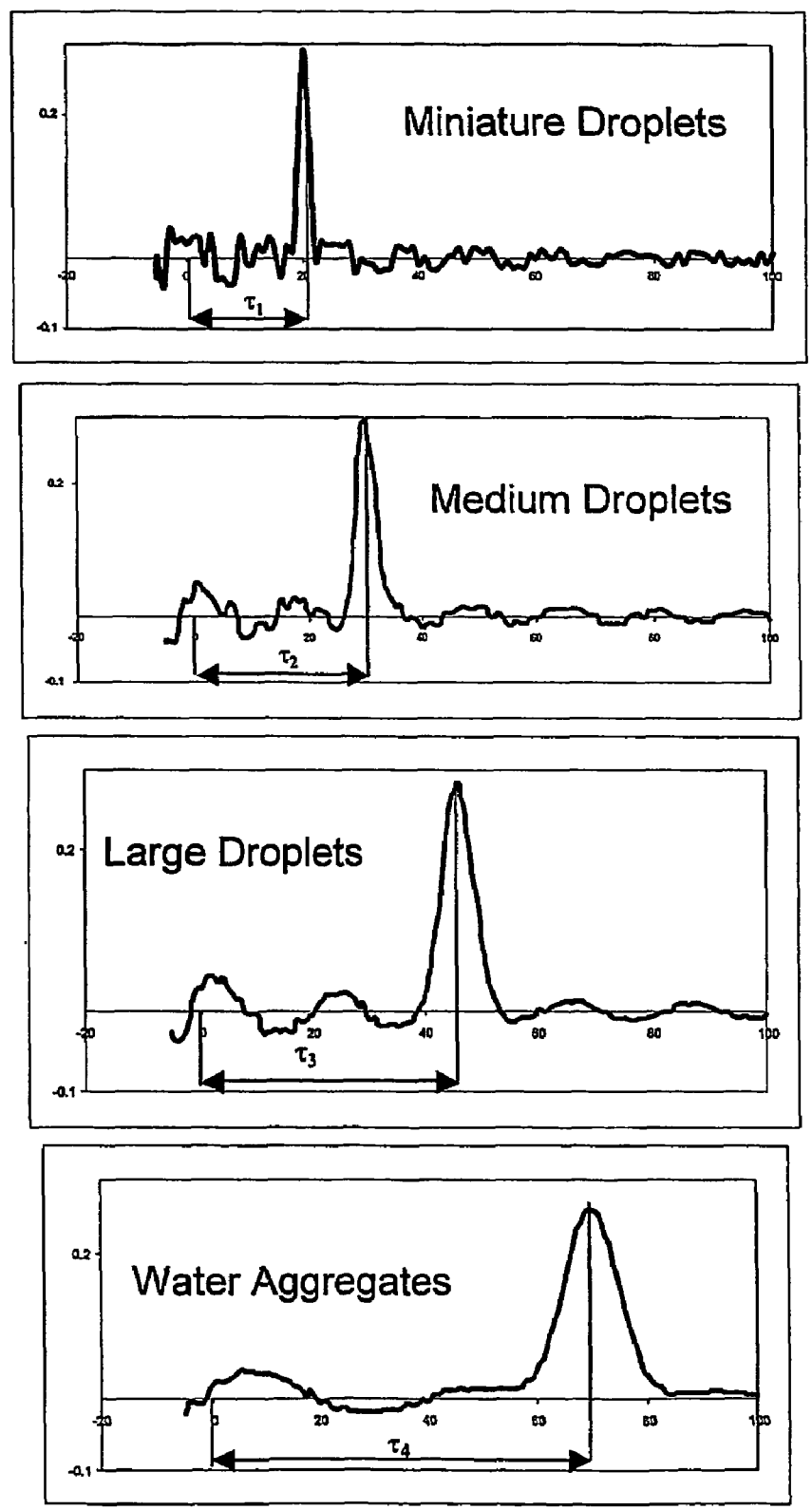
FIG. 5 is an example of four cross-correlation functions corresponding to four different components in steam flow.

The signals from photodetectors 20a and 20b may be filtered by band-pass filters, as described below, to isolate components of the signals at different frequencies which are generated by different flow components. The time delay τ is different for different flow components. Miniature water droplets are moving with the speed of water vapour whereas water aggregates are moving at much lower speed, causing a slug effect. Example cross-correlation functions corresponding to flow components 32, 34, 36 and 38/39 described above are illustrated in FIG. 5. In the FIG. 5 example, the elapsed time for miniature, medium and large droplets, and water aggregates is 20, 30, 46 and 70 μs, respectively. These time delays correspond to average velocities V of 50, 33, 22 and 14 m/s for flow components 32, 34, 36 and 38/39 respectively, for spacing d=1.0 mm.

Figure 6:
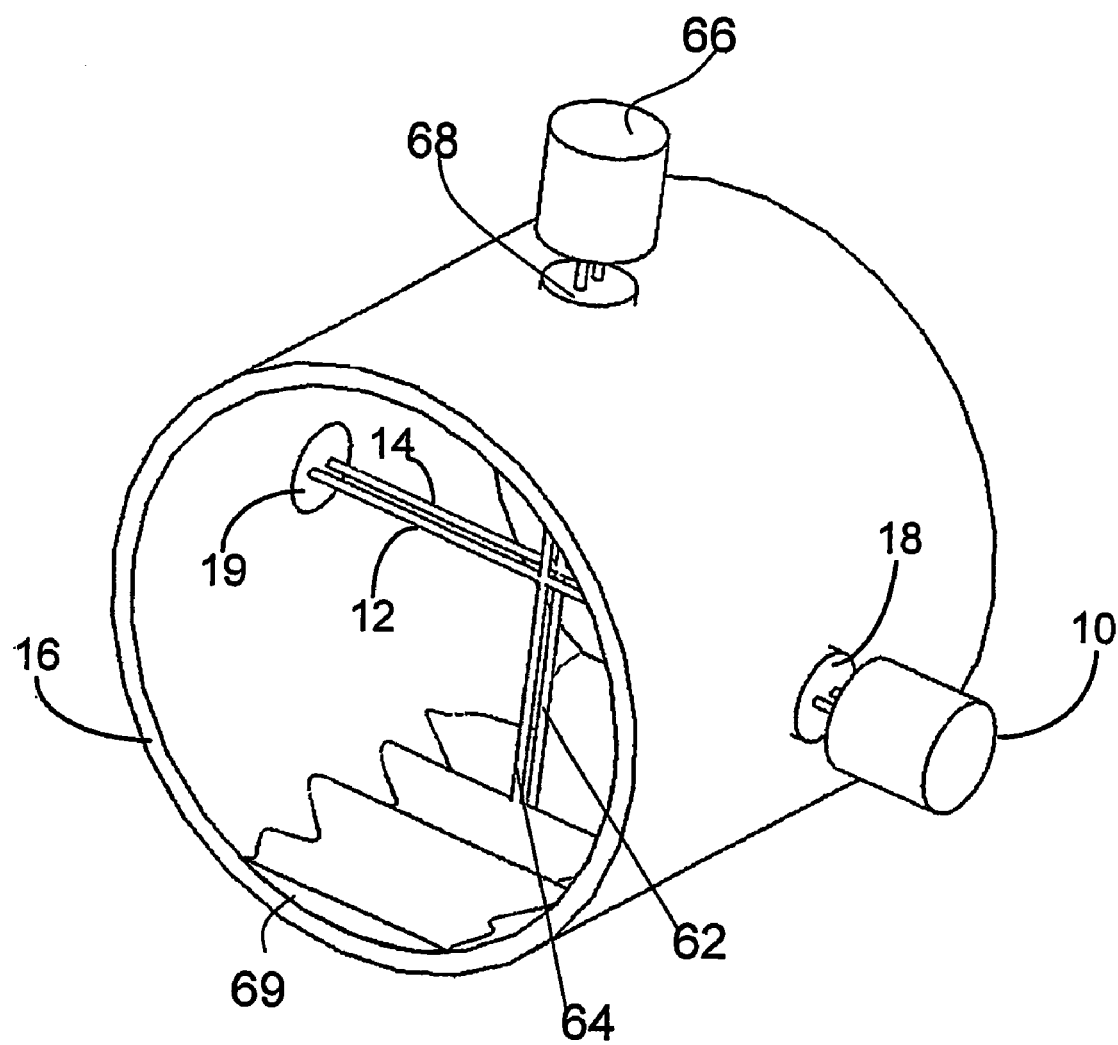
FIG. 6 is a schematic representation of an apparatus for sensing multiphase flow employing a vertical two-beam channel for measurement of water condensate according to another embodiment of the invention.

FIG. 6 illustrates another embodiment of the invention wherein an additional pair of beams 62 and 64 generated by another illuminator 66 are delivered through a window 68 into pipe 16 in the vertical direction. Beams 62 and 64 are coupled with a second collecting optical system (not shown in FIG. 6) located underneath the pipe in the same way as are beams 12 and 14 in FIG. 1. In addition to scattered and deflected light, the second collecting optical system focuses beams 62 and 64 directly on a pair of photodetectors, thus, providing the sensing of the beam attenuation in the water condensate 69 at the bottom of pipe 16. The attenuation is related to the depth h of the water condensate 69 in accordance with Beer's law:

$$I = I_0 \exp(-ah)$$

where $I_0$ is the intensity of the beam without any water condensate, I is the measured intensity of the beam, and a is the extinction coefficient. The cross-sectional area A of water condensate in pipe 16 is related to depth h as $$A = R^2 \arccos(1 - h/R) - (R-h)(2Rh - h^2)^{1/2}$$

where R is the radius of the pipe. The flow rate of the water condensate $F_{cond}$ may be calculated by multiplying this area by the velocity of the water condensate:

$$F_{cond} = AV_{cond}$$

Figure 7:
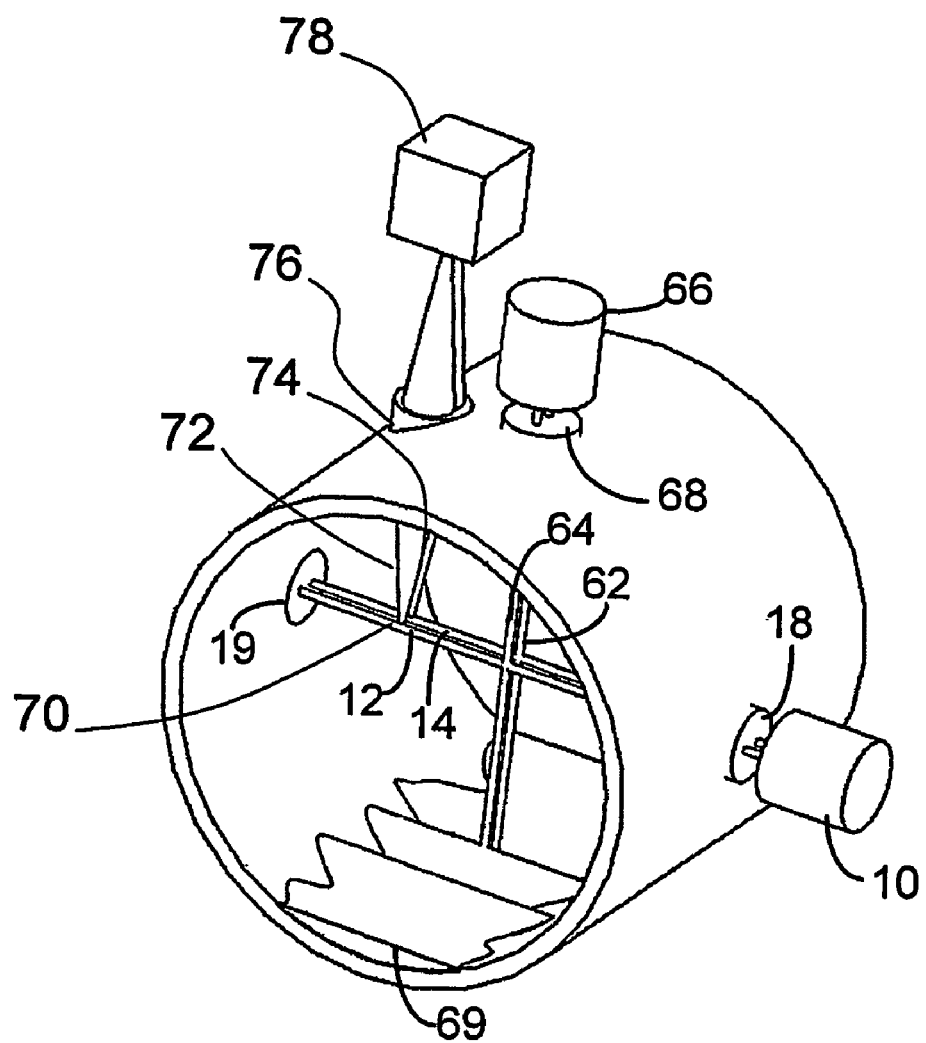
FIG. 7 is a schematic representation of an apparatus for sensing multiphase flow with an additional measuring zone across the pipe, according to another embodiment of the invention.
Figure 8:
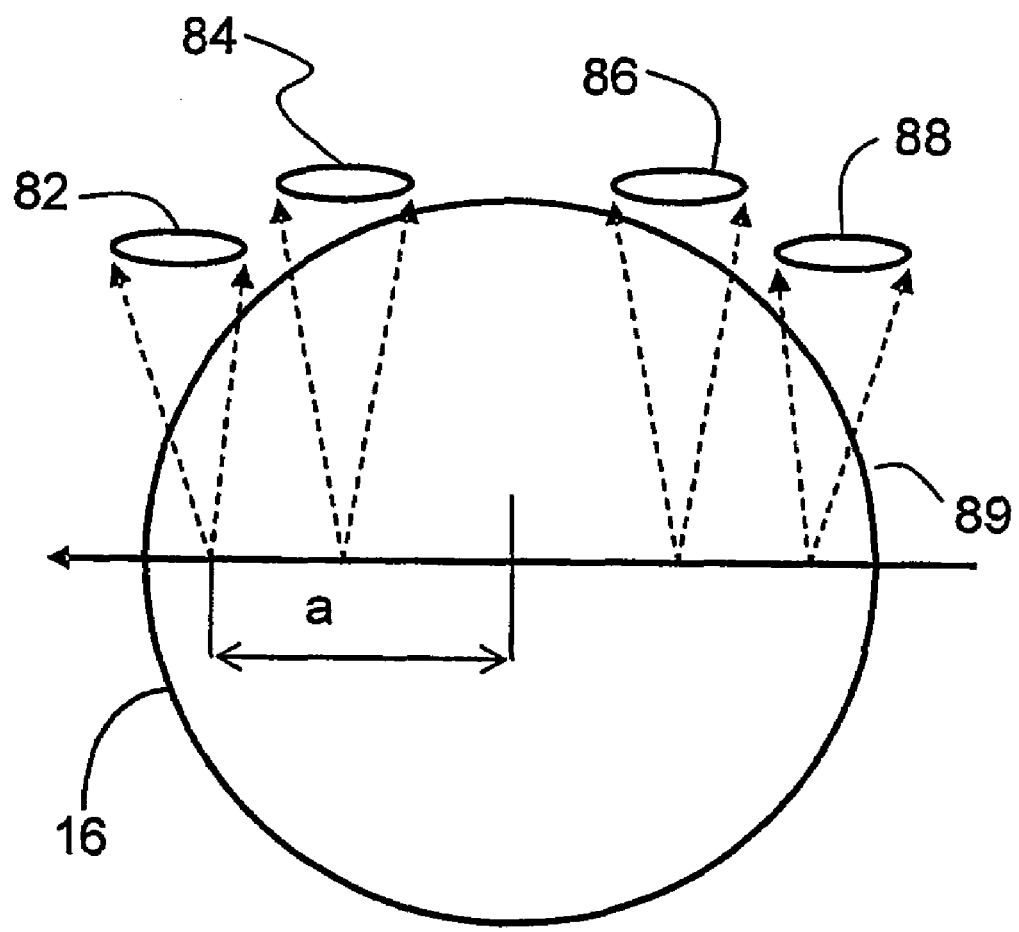
FIG. 8 is a schematic representation of multiple measuring zones across the pipe using multiple optical collecting systems, according to another embodiment of the invention.

Collection of the deflected and scattered light from a shallow angle along a beam spanning pipe 16 causes integration of the signal because the flow velocity varies across the section of pipe 16. Therefore, according to yet another embodiment of the present invention shown in FIG. 7, in addition to integral evaluation of the average velocity profile, the flow is analyzed at a local measuring zone 70. Light beams 72 and 74 scattered by water droplets at a near perpendicular angle are collected with an optical system 76 into a photodetector unit 78 comprising a pair of photodetectors. The measuring zone 70 can be located at various locations across pipe 16. An example of four measuring zones along the diameter of pipe 16 is shown in FIG. 8. Zones could be located at various distances a from the center of the pipe. One of the preferable distances is a=¾ R. Local flow velocity measured at this location is the closest to the average velocity in pipe 16 with practically no effect from the flow profile.

Figure 9:
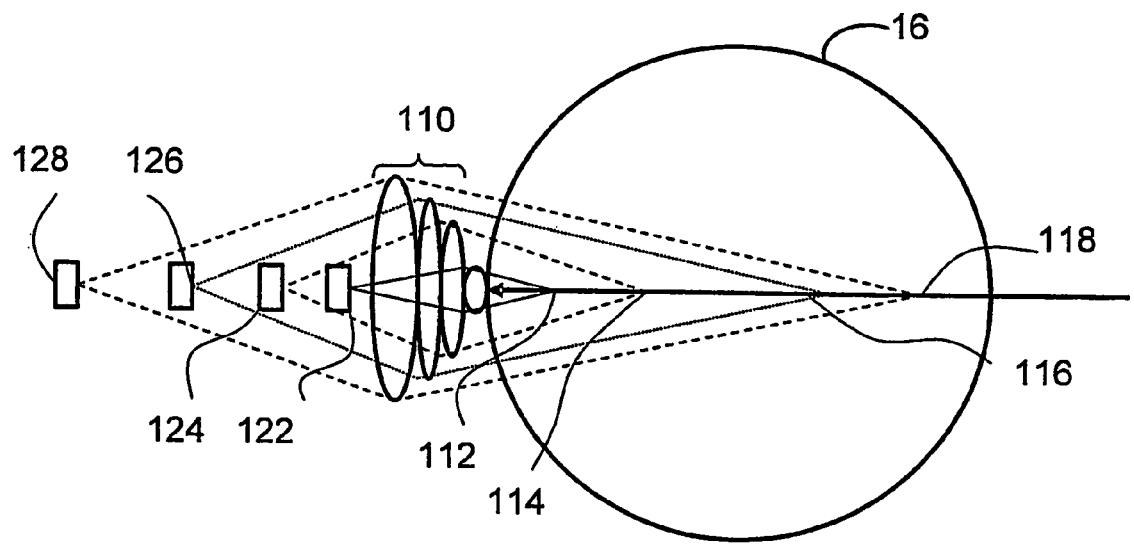
FIG. 9 is a schematic of a multi-focal coaxial collecting optical system, which collects light from the multiple measuring zones of FIG. 8.

Multiple point flow measurement can be simplified if a transparent section 89 is mounted into pipe 16. This section may represent a section of a glass pipe having the same internal diameter as pipe 16. Multiple point measurement could be achieved by using a multi-focal optical system such as one shown in FIG. 9. The optical system 110 consists of several optical components of various apertures, therefore, the optical power of the system varies with the number of components. In the example of FIG. 9, four measuring zones 112, 114, 116 and 118 are associated optically with four photodetectors 122, 124, 126 and 128, respectively, which measure scattered and deflected light from the measurement zones.

Figure 10:
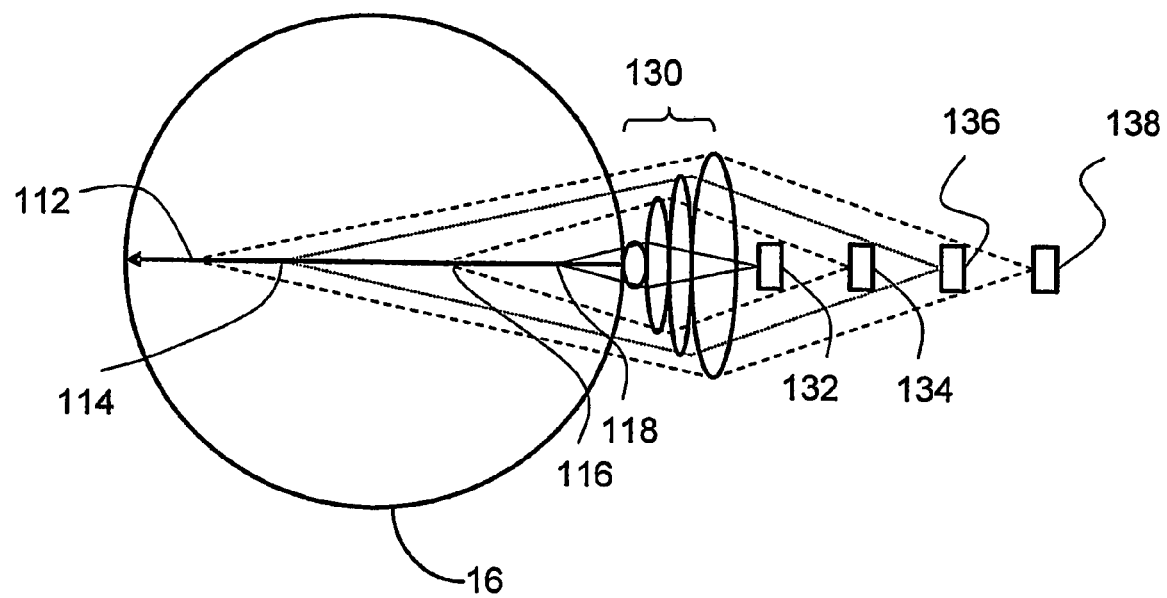
FIG. 10 is a schematic of a multi-focal coaxial collecting optical system, which collects light from the multiple measuring zones of FIG. 8, working in back-scattering mode.

Scattered and deflected light can also be collected in a back-scattered mode as is shown in FIG. 10. Photodetectors 132, 134, 136 and 138 measure scattered and deflected light from measuring zones 118, 116, 114 and 112, respectively, by means of a multi-focal optical system 130. The advantage of the back-scattering mode is the lower amount of background noise coming from the light scattered on pipe walls because the light being registered has been scattered under high angles.

Figure 11:
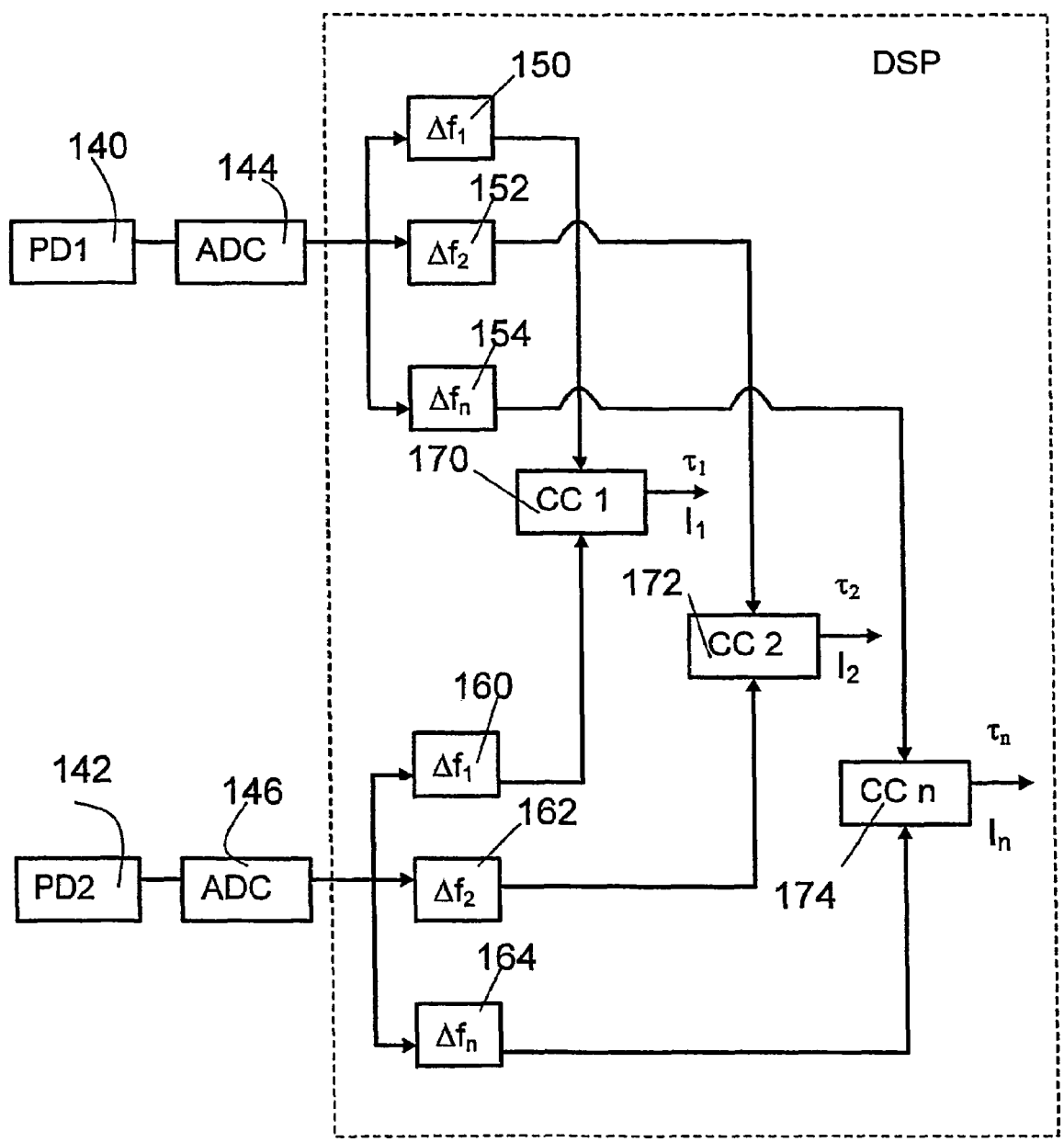
FIG. 11 is a block diagram illustrating an example of signal processing in a single channel with two photodetectors and multiple band-pass filters.

FIG. 11 schematically illustrates a signal processing means according to one embodiment of the invention. Electrical signals from photodetectors 140 and 142, which may be any pair of photodetectors spaced apart along the direction of flow, are amplified (amplifiers are not shown) and digitized in analog-to-digital converters 144 and 146. Preferably, digital signals further are processed by digital signal processor (DSP). The signals are filtered by digital band-pass filters 150, 152, 154, 160, 162 and 164. The number of digital filters may vary depending on the number of fluid components to be discriminated, which, in turn, is determined by the desired accuracy. The filter frequency bandwidth is determined by the number of bands to be selected and maximum fluid velocity. For example, to discriminate four-components of the steam flow with a maximum velocity of 50 m/s, the preferable bandwidths are: $\Delta f_1 = 0$ to 10 Hz; $\Delta f_2 = 10$ to 100 Hz; $\Delta f_3 = 100$ Hz to 1 kHz; and, $\Delta f_4 = 1$ to 100 kHz.

Cross-correlation functions are calculated for each pair of signals filtered with the same bandwidth using cross-correlation (CC) procedures 170, 172, 174. Time delay $\tau_i$ for each CC function is determined as a position of the CC maximum. Local velocities are calculated for each flow component using the ratio:

$$V_i = d/\tau_i$$

As described above, the fastest measured flow components are the miniature water droplets which move at the speed of the vapour fraction in pipe 16.

In addition to the velocities, the amount of each of the flow components may be calculated from the intensities of the filtered frequency components of the signals. For example, low intensity fluctuations recorded at bandwidth $\Delta f_3 = 100$ to 1,000 Hz indicate that the amount of medium size droplets (size about a micron for saturated steam) is low. The signal intensity at each bandwidth $I_i$ is representative of the amount of the liquid fraction of each flow component. The relationship between $I_i$ and the amount of the corresponding flow components is preferably established by calibration in a regulated flow environment. The intensities are preferably found as signal dispersions $$I_1 = \int_{\Delta f_1}(U_f)^2 df$$

$$I_2 = \int_{\Delta f_2}(U_f)^2 df$$

$$I_n = \int_{\Delta f_n}(U_f)^2 df$$

where $U_f$ is the spectral density of the signal, which represents the distribution of signal dispersion in frequency domain. The spectral density can be measured by using Fourier transforms or by any other known means.

Figure 12:
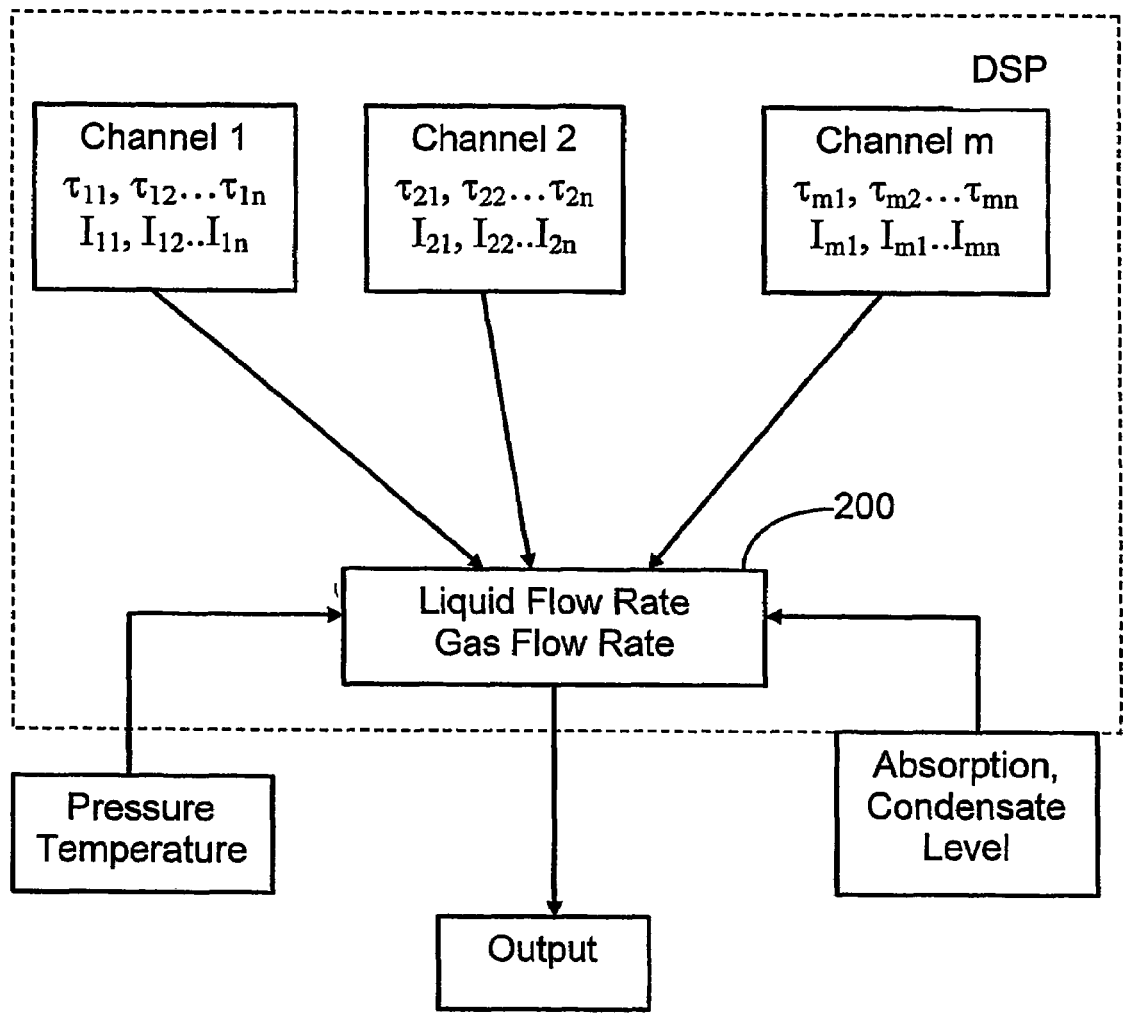
FIG. 12 is a block diagram illustrating an example of a calculation of liquid and gas flow rates based on m measuring channels and n flow components.
Figure 13:
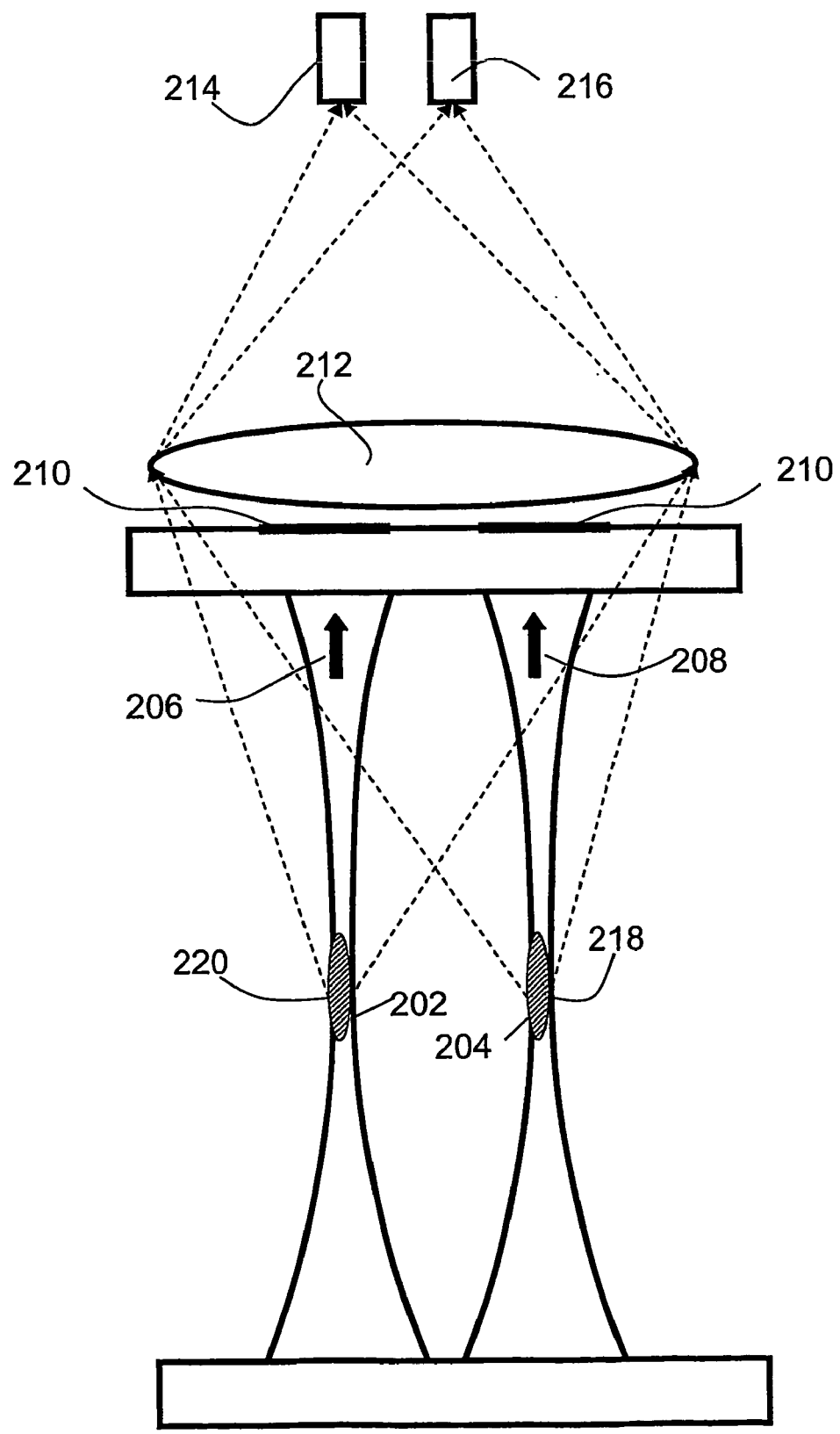
FIG. 13 is a schematic representation of an apparatus for sensing multiphase flow employing two light sheets created in the pipe according to another embodiment of the invention.

After calculating the velocities of the flow components and the intensities of the corresponding signals (which is indicative of the amount of the corresponding flow component) for each measuring zone or "channel", the final liquid (water) and gas (vapour) flow rates are found as is shown in FIG. 12. The number of channels depends on the number of pairs of beams illuminating the fluid flow and the number of measurement zones for each pair of beams. The time delay $\tau$ and intensity I are calculated for each of the n components for each of the m channels, and provided to a flow rate calculator 200. Flow rate calculator 200 also receives as inputs pressure and temperature data and the level of condensate 69 in the bottom of pipe, as calculated from absorption data as described above.

The vapour fraction is calculated from the fastest of the n-flow components, which are the nth components when $\Delta f_n$ is the highest frequency bandwidth, over all m channels as follows:

$$F_{vapour} = \sum_{i=1}^{m} I_{in} V_{in}$$

The total of the liquid and vapour fractions is calculated as a sum over all flow components:

$$F_{total} = \sum_{j=1}^{n} \sum_{i=1}^{m} I_{ij} V_{ij}$$

The quality of steam may be determined by the ratio:

$$Q = \frac{\text{Vapour(mass)}}{\text{Vapour(mass)} + \text{Water(mass)}} = \frac{F_{vapour}}{F_{total}}$$

The equations above are corrected by pressure and temperature factors. The liquid condensate may be taken into account by calculating the cross-section of the pipe filled with liquid at a level (depth) h based on the absorption measurement described above with reference to FIG. 6.

According to another embodiment of the invention, the collimated beams 12 and 14 (FIG. 1) are focused in the direction of flow by using a cylindrical lens, thus, two narrow light sheets 202 and 204 are created as shown in FIG. 3. The sheets are oriented perpendicular to the flow direction and are spaced apart along the flow direction similar to collimated beams of FIG. 1. The direct light shown as arrows 206 and 208, is obscured by a non-transparent mask 210. The optical system 212 collects only light scattered by water droplets in pipe 16. The light is collected on photodetectors 214, 216. Each photodetector is associated with one light sheet. A viewing area 218 of photodetector 214 is determined by the size of the sensitive area of the photodetector, and the collecting aperture and the focal distance of the optical system 212. A viewing area 220 of photodetector 216 is determined in the same way. Because steam is associated with high temperature, photodetectors 214 and 216 can be replaced with optical fibers coupled with the photodetectors outside the device. The advantage of this embodiment is two-fold: first, light is more concentrated than in collimated beams; and, second, the system operates in dark-field without strong direct light which can saturate photodetectors. This improves the detectability of the device and allows the use of sensitive avalanche photodiodes (APD) as photodetectors 214, 216 if steam quality is approaching 100% or steam is superheated.

Light sheets 202, 204 may be provided at various locations within pipe 16. The sheets can be located in the center of the pipe, with the centerline velocity being measured using the cross-correlation technique. The centerline velocity must be converted into average velocity in order to calculate the total flow of the fluid. This conversion can be done by calculating the Reynolds number through known temperature and pressure of the fluid. Alternatively, the sheets can be located at ¼ radius from the pipe wall. This location eliminates the need for velocity conversion because the measured velocity at this point represents the integral velocity along pipe 16.

Figure 14:
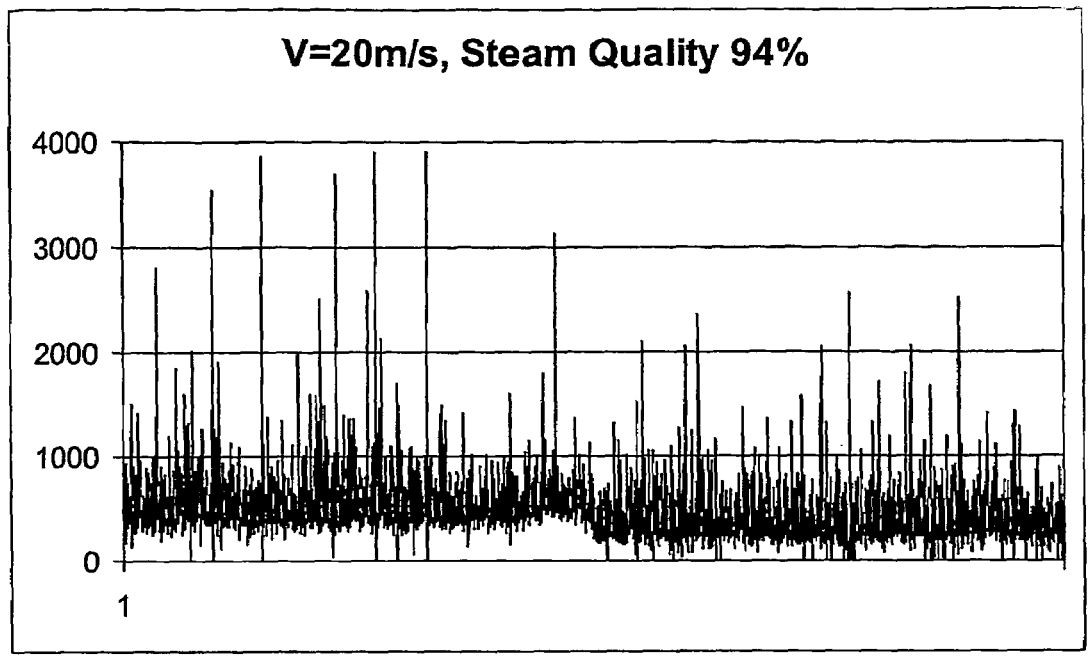
FIG. 14A is an example of a signal measured by one of the photodetectors of FIG. 13 while measuring high quality steam.
FIG. 14B is an example of a signal measured by one of the photodetectors of FIG. 13 while measuring low quality steam.
Figure 14:
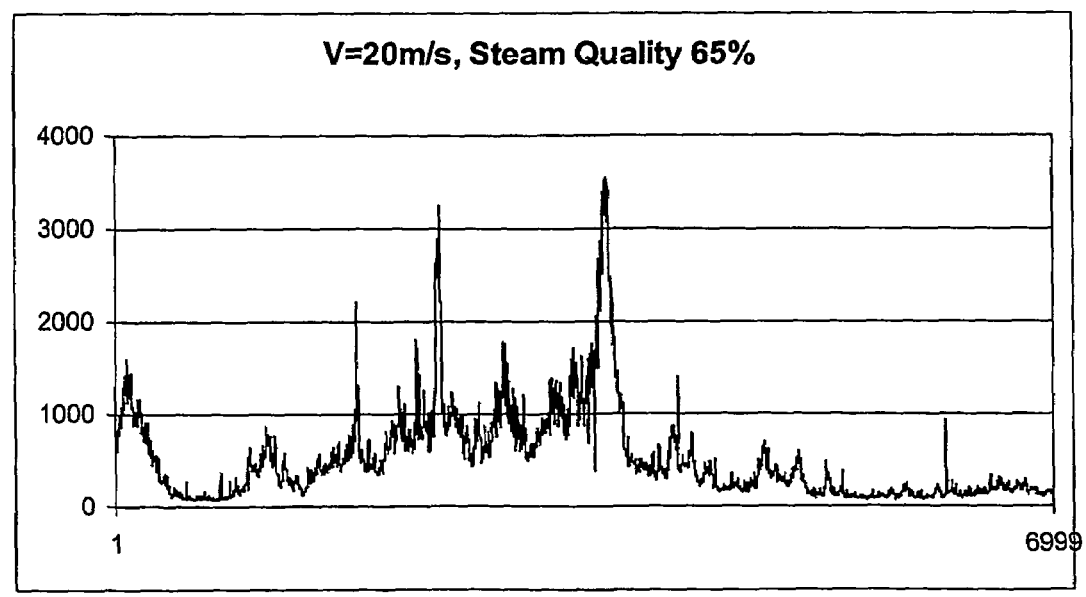

In addition to determining the flow velocity through cross-correlation calculation, the signal processing means for this embodiment may be used to calculate dispersion of the signals from photodetectors 214, 216. FIG. 14A and FIG. 14B show the signal from one of the photodetectors while monitoring steam moving at a speed of 20 m/s and having a quality of 94% and 65%, respectively. Higher water content or lower steam quality resulted in increasing the signal dispersion from 0.52 to 0.97 in this example.

Figure 15:
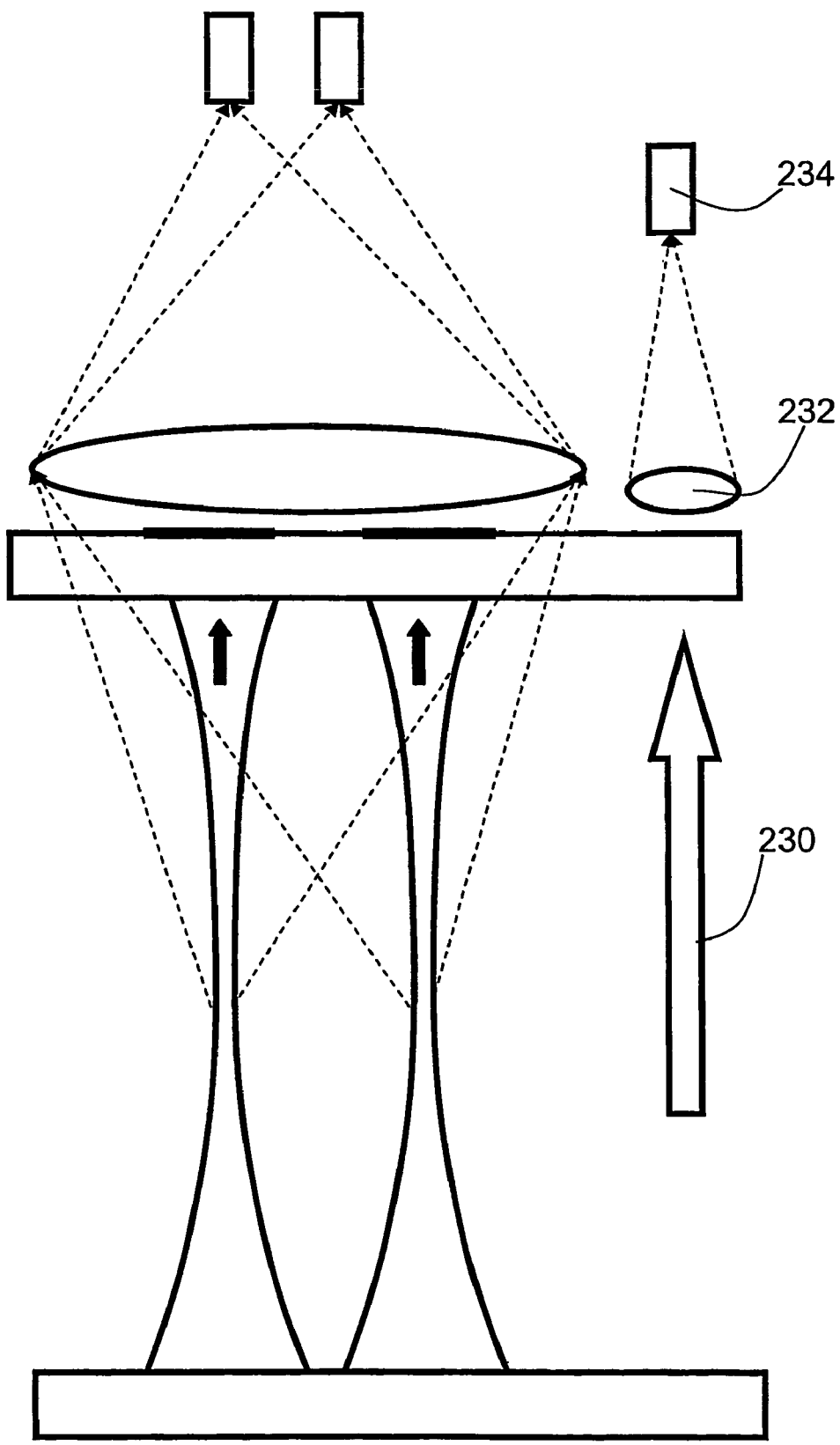
FIG. 15 is a schematic representation of an apparatus for sensing multiphase flow employing two light sheets created for measurement of fluid velocity and an additional collimated beam for measurement of liquid content according to another embodiment of the invention.
Figure 16:
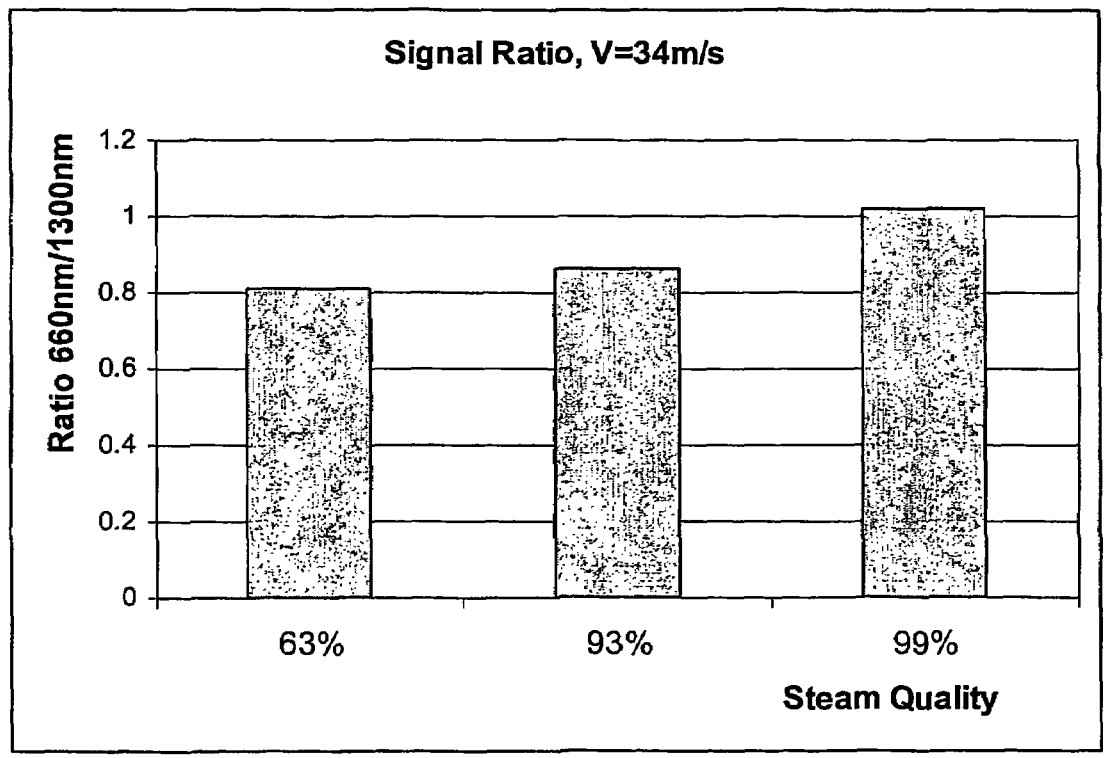
FIG. 16 is an example of signal ratios recorded by the reference photodetector of FIG. 15 at two different wavelengths.

According to yet another embodiment, a collimated beam 230 is added to two light sheets as shown in FIG. 15. The two light sheets are used to determine the flow velocity in a way as described above. Light from the collimated beam 230 is attenuated by the fluid flowing in pipe 16, and it is collected by an optical system 232 into a reference photodetector 234. In addition to velocity measurement using the cross-correlation technique, the signal processing means for this embodiment may be used to calculate dispersion of the signal from reference photodetector 234. Alternatively, collimated beam 230 of the FIG. 15 embodiment may be produced by an illuminator having a plurality of light sources, of which at least one light source generates light of a first wavelength which is highly absorptive in the fluid in the pipe 16, and at least one other light source generates light of a second wavelength which is less absorptive in the fluid in pipe 16. The light sources may be switched using time multiplexing or a number of reference photodetectors can be used, each associated with a narrow-band optical filter for selecting a proper light source. The light sources may comprise light-emitting diodes (LEDs) or lasers emitting in the visible range which is transparent for water, for example, red LEDs or lasers with a wavelength close to 660 nm. Water attenuation increases in the near-IR region, therefore, another spectral band for determining water content can have a wavelength close to 1360 nm or longer. FIG. 16 shows example signal ratios (660 nm over 1300 nm) recorded for steam of various quality moving in a 2-inch pipe at V=34 m/s. The signal ratio increases with the steam quality in this example.

The embodiments described above can be accomplished by a variety of ways. Preferably, light emitting diodes (LEDs) are used in illuminators as light sources. In particular, green, red and near-infrared LEDs are suitable for this application as they are matched well with readily available and sensitive Si-photodiodes, which may be used as photodetectors. UV and blue LEDs provide better scattering efficiency due to the shorter wavelength, however, this may lead to high background light scattered inside pipe 16 and on optical windows 18 and 19, in particular. It may be desirable to use fiber optic components in illuminating and collecting optics for steam pipelines because the operating temperature for steam pipelines can be too high for direct contact with light sources and photodetectors. Semiconductor lasers are more suitable for fiber optics because they provide high coupling efficiency to thin fibers. Intensive laser beams (power ranging from 1 to 10 mW) can be delivered through the windows at long distances using inexpensive visible and near-infrared lasers. Liquid fractions in the flow effectively scatter and deflect the propagating light, which can be collected at the photodetectors. The amount of light collected by the optical system such as the dark-field system shown in FIG. 9, can reach 1 W in a 2-inch steam pipeline. Such light intensity provides a signal-to-noise ratio in excess of 104 in PIN photodiodes or avalanche photodiodes. Therefore, time delays can be measured with high accuracy. The devices and methods described above provide good averaging of flow velocity across pipe 16. This reduces the error caused by the uncertainty of the flow profile and flow profile skewing which is the major source of the inaccuracy for ultrasonic flow meters. The described methods are not affected by shock or vibration because they are not based on interference. The present invention provides robust and reliable devices, and methods, which are not affected by turbulence. As opposed to other non-invasive flow metering techniques, such as, for example, ultrasonic methods, the flow turbulence is used in the present invention for modulation of scattered and deflected light. The modulation depth increases with the turbulence level.

As will be apparent to those skilled in the art in the light of the foregoing disclosure, many alterations and modifications are possible in the practice of this invention without departing from the spirit or scope thereof. For example, although the embodiment of FIG. 1 described above employs two beams and four photodetectors, it is to be understood that more than two beams could be used and the cross-correlation functions could be applied to any two of the beams. Also, the signals could be measured by any number of photodetectors, provided there is at least one photodetector for each beam. Accordingly, the scope of the invention is to be construed in accordance with the substance defined by the following claims.

What is claimed is:

1. A method for measuring the velocity of a multiphase fluid flowing in a pipe having transparent portions, the multiphase fluid comprising a liquid phase and a gaseous or solid phase, the method comprising the steps of:

directing a pair of collimated beams of light from an illuminator through the multiphase fluid by said transparent portions of the pipe, said pair of collimated beams spaced apart in a direction of flow of the multiphase fluid by a predetermined distance;

detecting scattered, deflected and attenuated light with a pair of photodetectors to produce a pair of signals, each of said pair of photodetectors associated with one of said pair of collimated beams;

calculating a cross-correlation function between said pair of signals to determine a time delay between the signals;

calculating the average velocity of the multiphase fluid by taking the ratio of the predetermined distance to the time delay between the signals; and passing the pair of signals through a plurality of band-pass filters to isolate a plurality of pairs of corresponding frequency components, each of the plurality of pairs of corresponding frequency components corresponding to one of a plurality of flow components.

2. The method according to claim 1 further comprising, for each of said plurality of pairs of corresponding frequency components, the steps of:

calculating a cross-correlation function between the pair of corresponding frequency components to determine a time delay between the corresponding frequency components; and calculating the velocity of the corresponding flow component by taking the ratio of the predetermined distance to the time delay between the corresponding frequency components.

3. The method according to claim 2 further comprising the step of determining an intensity of each of said pairs of frequency components and calculating an amount of a corresponding one of said plurality of flow components from said intensity.

4. The method according to claim 3 further comprising the step of determining a flow rate of each of said plurality of flow components by multiplying the velocity of each flow component by the intensity of the corresponding pair of frequency components.

5. The method according to claim 4 wherein a vapour fraction of said multiphase flow is calculated as a flow rate of a fastest one of said plurality of flow components.

6. The method according to claim 5 further comprising the step of determining a total flow rate of said multiphase flow by summing the flow rates of all of said plurality of flow components.

7. The method according to claim 6 further comprising the step of calculating a quality of the multiphase flow by taking a ratio of the vapour fraction to the total flow rate.

8. An apparatus for measuring the velocity of a multiphase fluid flowing in a pipe having transparent portions, the multiphase fluid comprising a liquid phase and a gaseous or solid phase, the apparatus comprising:

an illuminator for generating a pair of collimated beams of light and directing said beams through the multiphase fluid by said transparent portions of the pipe, said pair of collimated beams spaced apart in a direction of flow of the multiphase fluid by a predetermined distance;

a pair of photodetectors positioned across the pipe from said illuminator, each of said pair of photodetectors optically associated with one of said pair of collimated beams for detecting scattered, deflected and attenuated light from the associated beam and generating a signal; and a signal processing apparatus for processing the signals from said pair of photodetectors and calculating cross-correlation functions between the signals to determine a time delay, and for calculating the velocity of the multiphase fluid by taking a ratio of the predetermined distance to the time delay, said signal processing apparatus comprising a plurality of band-pass filters for isolating a plurality of frequency components of each of the pair of signals.

9. The apparatus according to claim 8 wherein said illuminator comprises a first illuminator for generating a first pair of collimated beams, and wherein said pair of photodetectors comprises a first pair of photodetectors, the apparatus further comprising:

a second illuminator for generating a second pair of collimated beams of light and directing said second pair of beams through the multiphase fluid at an angle to said pair of beams generated by said first illuminator; and a second pair of photodetectors positioned across the pipe from said second illuminator, each of said second set pair of photodetectors optically associated with one of said second pair of collimated beams for detecting scattered, deflected and attenuated light from the associated beam and for generating a signal, wherein said signals from said second pair of photodetectors are processed by said signal processing apparatus.

10. The apparatus according to claim 9 wherein the angle is perpendicular.

11. The apparatus according to claim 9 further comprising at least one optical system for focusing light scattered at a near perpendicular angle from said pair of collimated beams from at least one measurement zone onto at least one photodetector.

12. The apparatus according to claim 8 further comprising a multi-focal optical system for focusing light scattered at a shallow angle from said pair of collimated beams from a plurality of measurement zones onto a plurality of photodetectors.

13. The apparatus according to claim 8 further comprising a multi-focal optical system for focusing light scattered at a near 180 degree angle from said pair of collimated beams from a plurality of measurement zones onto a plurality of photodetectors.

14. A method for measuring the velocity of a multiphase fluid flowing in a pipe having transparent portions, the multiphase fluid comprising a liquid phase and a gaseous or solid phase, the method comprising the steps of:

directing a pair of light sheets from an illuminator through the multiphase fluid by said transparent portions of the pipe, said pair of light sheets oriented perpendicular to a direction of flow of multiphase fluid and spaced apart in the direction of flow by a predetermined distance;

detecting scattered and deflected light with a pair of photodetectors to produce a pair of signals, each of said pair of photodetectors being associated with one of said pair of light sheets;

calculating a cross-correlation function between said pair of signals to determine a time delay between the signals;

calculating the average velocity of the multiphase fluid by taking the ratio of the predetermined distance to the time delay; and calculating an amount of liquid fraction in the multiphase fluid based on dispersion of signals from said photodetectors.

15. The method according to claim 14 further comprising the steps of:

directing at least one collimated beam in a direction generally parallel to said pair of light sheets;

detecting deflected and attenuated light from said collimated beam with a reference photodetector to produce a signal associated with said collimated beam; and calculating the amount of liquid fraction in the multiphase fluid based on dispersion of the signal from said reference photodetector.

16. The method according to claim 14 further comprising the steps of:

directing at least one collimated beam in a direction generally parallel to said pair of light sheets, said collimated beam comprising light of a first wavelength with high absorbance in a liquid fraction and light of a second wavelength with low absorbance in the liquid fraction;

detecting attenuated light with reference photodetectors to produce a first signal corresponding to light of said first wavelength and a second signal corresponding to light of said second wavelength; and calculating the amount of liquid fraction in the multiphase fluid based on a ratio of said first and second signals.

17. An apparatus for measuring the velocity of a multiphase fluid flowing in a pipe having transparent portions, the multiphase fluid comprising a liquid phase and a gaseous or solid phase, the apparatus comprising:

an illuminator for generating a pair of light sheets and directing said light sheets through the multiphase fluid by said transparent portions of the pipe, said pair of light sheets oriented perpendicular to a direction of flow of multiphase fluid and spaced apart in the direction of flow by a predetermined distance;

a pair of photodetectors positioned across the pipe from said illuminator, each of said pair of photodetectors optically associated with one of said light sheets for detecting scattered light from the associated light sheet and for generating a signal; and a signal processing apparatus for processing the signals from said pair of photodetectors, for calculating cross-correlation functions between the signals to determine a time delay, for calculating the velocity of the multiphase fluid by taking a ratio of the predetermined distance to the time delay, and for calculating an amount of liquid fraction in the multiphase fluid based on dispersion of signals from said photodetectors.

18. The apparatus according to claim 17 further comprising:

a reference illuminator for generating a collimated beam and directing said collimated beam through the multiphase fluid by said transparent portions of the pipe;

a reference photodetector positioned across the pipe from said reference illuminator and optically associated with said collimated beam for detecting attenuated light from said collimated beam and generating a signal; and a reference signal processing apparatus for processing said signal from said reference photodetector and calculating the amount of liquid fraction in the multiphase fluid based on dispersion of said signal.

19. The apparatus according to claim 17 further comprising:

a reference illuminator for generating a collimated beam and directing said collimated beam through the multiphase fluid by said transparent portions of the pipe, said collimated beam comprising light of a first wavelength with high absorbance in a liquid fraction and light of a second wavelength with low absorbance in the liquid fraction;

reference photodetectors positioned across the pipe from said illuminator and optically associated with said collimated beam for detecting attenuated light from said collimated beam and for generating a first signal corresponding to light of said first wavelength and a second signal corresponding to light of said second wavelength; and a reference signal processing apparatus for processing said first and second signals and calculating the amount of liquid fraction in the multiphase fluid based on a ratio of said first and second signals.

* * * * *